T. S. EASTWICK AND S. WEISS.
TRANSMISSION MECHANISM.
APPLICATION FILED JUNE 29, 1921.
1,432,983.
Patented Oct. 24, 1922.
2 SHEETS—SHEET 1.
Fig. 1.
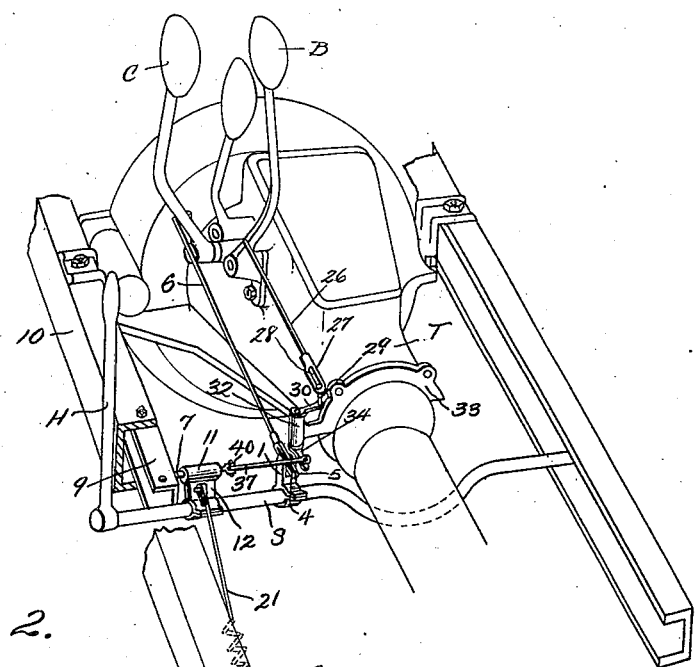
Fig. 2.
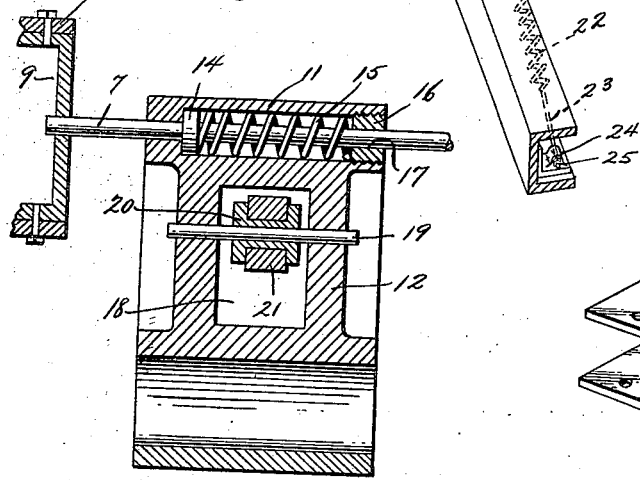
Fig. 3.
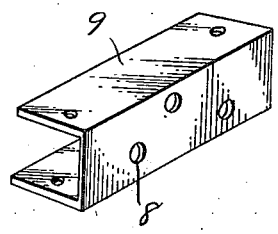
Fig. 8.
Inventors
Thomas S. Eastwick
Simon Weiss
By Watson E. Coleman
Attorney

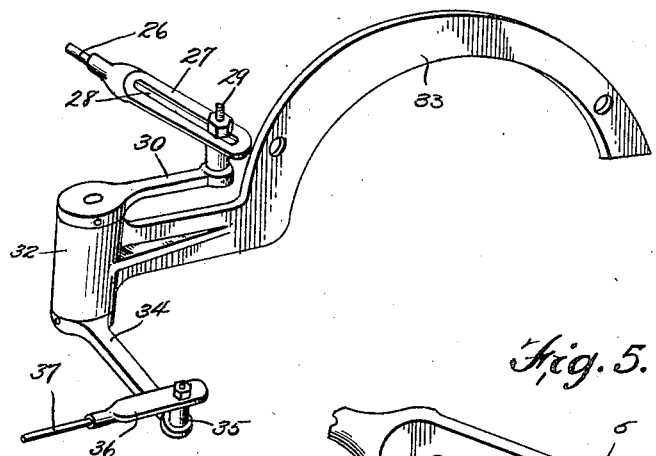
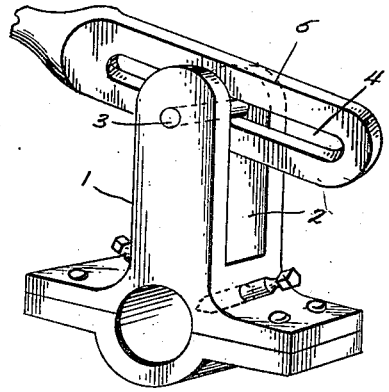
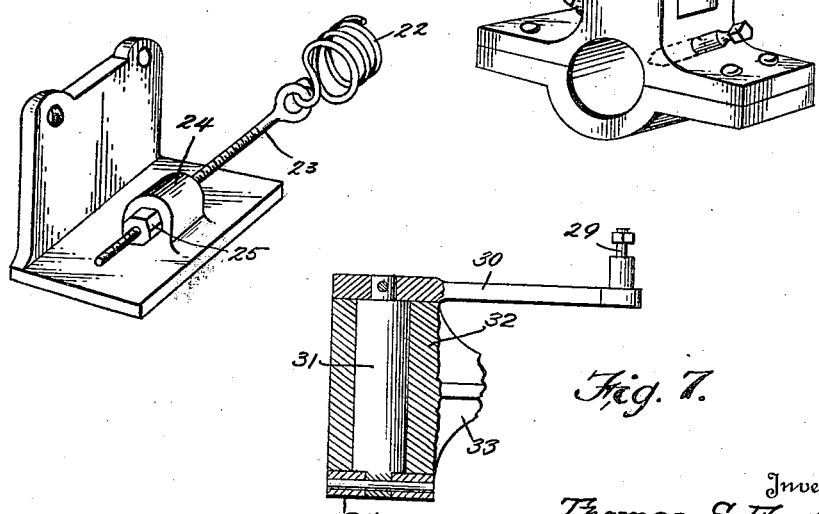

Patented Oct. 24, 1922.

1,432,983

UNITED STATES PATENT OFFICE.

THOMAS STEPHEN EASTWICK AND SIMON WEISS, OF CAMDEN, NEW JERSEY.

TRANSMISSION MECHANISM.

Application filed June 29, 1921. Serial No. 481,291.

*To all whom it may concern:*

Be it known that we, THOMAS S. EASTWICK and SIMON WEISS, citizens of the United States, residing at Camden, in the county of Camden and State of New Jersey, have invented certain new and useful Improvements in Transmission Mechanisms, of which the following is a specification, reference being had to the accompanying drawings.

This invention relates to certain improvements in transmission mechanisms and has relation more particularly to a mechanism of this general character of the well known Ford type embodying a clutch lever, a brake lever and an emergency control lever associated with the controller shaft, and it is an object of the invention to provide novel and improved means whereby the emergency or hand lever may be automatically thrown back or moved into set position when the brake lever or pedal is moved forwardly and wherein means is provided for moving the emergency or hand lever forwardly or in engaged position with respect to the clutch.

The invention consists in the details of construction and in the combination and arrangement of the several parts of our improved transmission mechanism whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a fragmentary view in perspective illustrating a transmission mechanism constructed in accordance with an embodiment of my invention.

Figure 2 is an enlarged fragmentary sectional view illustrating the means for locking the controller shaft and also for automatically moving the same in one direction, Figure 3 is a view in perspective of the bracket comprised in said locking mechanism, Figure 4 is a fragmentary view in perspective of a portion of the structure for releasing the mechanism, Figure 5 is an enlarged fragmentary view of a part of the mechanism operable from the clutch lever, Figure 6 is a fragmentary view in perspective of the adjustable connection for an end portion of the retractile member associated with the controller shaft, Figure 7 is a fragmentary view partly in elevation and partly in section illustrating the mounting for the rock arms included in the means for releasing the locking mechanism, and Figure 8 is a fragmentary view partly in section and partly in elevation illustrating the connection between the locking pin and the coacting rod.

As disclosed in the accompanying drawings, C denotes a clutch pedal as comprised in the transmission of the well known Ford type and B the brake lever also included in such transmission. S denotes the controller shaft with which is associated a hand lever H and which hand lever, as is well known, when pulled back as far as it will go, acts as an emergency brake on the rear wheels and which is all the way forward when the mechanism is operating in high or low speed. The lever H when the transmission mechanism is in reverse is in substantially a vertical position.

Clamped to the controller shaft at a desired distance to one side of the transmission case T, is an upstanding rock arm 1, having its upper portion bifurcated and with the kerf 2 of the bifurcation intersected by a pin 3. This pin 3 is freely disposed through a longitudinally disposed slot 4 provided in an elongated head 5. Threaded or otherwise engaged with an end portion of the head 5, is an end portion of a rod 6, the opposite end portion of said rod being engaged with the clutch pedal C at a point above its connection with the slow speed shaft of the transmission.

The slot 4 is of a length to permit the desired operation of the clutch pedal C as required for the necessary control of the transmission but when the clutch pedal C is forced or pushed completely forward to bring the transmission into low, the head 5 will engage the pin 3 before the completion of such movement or operation and swing or rock the arm 1 forwardly and at the same time the controller shaft S is turned in a direction whereby the pedal C when released engages the high speed clutch. During this movement of the shaft S, the hand lever H is caused to move forward without a separate manual operation by the driver.

The shaft S and the hand lever H are maintained in this forward position through the medium of a pin 7 which engages within a recess or notch 8 provided in a bracket 9 secured in desired location to an adjacent beam 10 of the chassis. The pin 7 is slidably mounted in a tubular head 11 carried by the upper end portion of an arm 12 fixed to the shaft S. A portion of the pin 7 is provided with an enlargement 14 and interposed between this enlargement 14 and the inner end of the head 5 is an expansible member 15, herein disclosed as a coil spring, which constantly urges the pin 7 in a direction toward the coacting bracket 8. The inner end of the head 11 with which the expansible member 15 contacts preferably comprises a removable cap 16 provided with an axial bore or opening 17 so that said cap serves as a guide for the inner end portion of the pin 7. The central portion of the arm 12 is cut out, as at 18, and said cut out portion is intersected by a pin 19. Mounted on said pin 19 within the cut out portion 18 is a roller 20 to which is secured an extended end porton 21 of a retractile member or spring 22. The opposite end portion of the spring or member 22 is provided with an extension 23 which is adjustably connected, as at 24, with a bracket 25. The bracket 25 is anchored to the beam 10 at a point inwardly of the shaft S. The adjustable connection between the bracket 25 and the extension 23 permits a regulation of the tension of the spring or member 22 in accordance with the necessities of practice.

When the arm 1 is thrown forward, the corresponding movement of the arm 12 will place the spring or member 22 under such tension that when the pin 7 is disengaged from the bracket 9, the hand lever H will be thrown automatically back or into set position.

In the present embodiment of our invention, the pin 7 is retracted or disengaged from the coacting bracket 9 upon forward movement of the brake lever B. Operatively engaged with the lever B above its mounting or brake pedal shaft is a rod 26 which extends rearwardly of the transmission case T and is provided at its rear end portion with an elongated head 27. The head 27 is provided with a longitudinally disposed slot 28 through which is freely disposed an upstanding spindle 29 carried by a rock arm 30.

The rock arm 30 is fixed to the upper end portion of a vertically directed shaft 31 disposed through a bearing 32. The bearing 32 is comprised in a bracket 33 secured to the free or rear end portion of the transmission case T. The lower end portion of the shaft 31 is provided with a second rock arm 34 having an upstanding spindle 35. Pivotally engaged with the spindle 35 is a head 36 carried by an end portion of a rod 37. The opposite end portion of the rod 37 is pivotally engaged within the fork 38 of a head 39, said head 39 being in threaded engagement or otherwise secured, as at 40, to the inner end portion of the pin 7, hereinbefore referred to. When the pedal B is pushed or forced to the limit of its forward movement, the shaft 31 through the instrumentality of the rod 26 will be rocked in a direction whereby the rod 37 will be moved in a direction to retract or disengage the pin 7 from the coacting bracket 9.

From the foregoing description it is thought to be obvious that a transmission mechanism constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In combination with a planetary transmission including a clutch pedal, a brake pedal and an associated controller shaft, an operative connection between the clutch pedal and the controller shaft for imparting movement to the controller shaft upon movement of the clutch pedal in one direction, means for holding the controller shaft against movement, mechanism operated from the brake pedal for releasing said means, and a retractile member placed under tension upon movement of the controller shaft from the clutch pedal and operating to return automatically said controller shaft upon release of the holding means.

2. In combination with a planetary transmission including a clutch pedal, a brake pedal and an associated controller shaft, an operative connection between the clutch pedal and the controller shaft for imparting movement to the controller shaft when the clutch pedal is pushed into low, means for holding the controller shaft against movement, mechanism operated from the brake pedal for releasing said means, and a retractile member placed under tension upon movement of the controller shaft from the clutch pedal and operating to return automatically said controller shaft upon release of the holding means.

3. In combination with a planetary transmission including a clutch pedal, a brake pedal and an associated controller shaft, an operative connection between the clutch pedal and the shaft for rotating the shaft in one direction when the clutch pedal is moved into low, a rock arm carried by the shaft, mechanism carried by said arm for holding the shaft against movement, a retractile member associated with said arm and placed under tension when the shaft is rotated upon moving the clutch pedal into low to move automatically said shaft when the holding mechanism is released, and means operatively connected with the brake pedal for releasing said holding means.

4. In combination with a planetary transmission including a clutch pedal, a brake pedal and an associated controller shaft, an operative connection between the clutch pedal and the controller shaft for imparting movement to the controller shaft upon movement of the clutch pedal in one direction, means for holding the controller shaft against movement, mechanism operated from the brake pedal for releasing said means, and means operating to return automatically said controller shaft upon release of the holding means.

5. In combination with a planetary transmission including a clutch pedal, a brake pedal and an associated controller shaft, an operative connection between the clutch pedal and the controller shaft for imparting movement to the controller shaft when the clutch pedal is pushed into low, means for holding the controller shaft against movement, mechanism operated from the brake pedal for releasing said means, and means operating to return automatically said controller shaft upon release of the holding means.

In testimony whereof we hereunto affix our signatures.

THOMAS STEPHEN EASTWICK.
SIMON WEISS.